(12) United States Patent
Oh

(10) Patent No.: US 11,352,939 B2
(45) Date of Patent: Jun. 7, 2022

(54) APPARATUS AND METHOD FOR CONTROLLING OIL PUMP FOR VEHICLE

(71) Applicants: HYUNDAI MOTOR COMPANY, Seoul (KR); KIA MOTORS CORPORATION, Seoul (KR)

(72) Inventor: Neung Seop Oh, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 7 days.

(21) Appl. No.: 17/070,647

(22) Filed: Oct. 14, 2020

(65) Prior Publication Data

US 2021/0404370 A1 Dec. 30, 2021

(30) Foreign Application Priority Data

Jun. 25, 2020 (KR) .......................... 10-2020-0077809

(51) Int. Cl.
*G06G 7/70* (2006.01)
*F01P 7/16* (2006.01)
(Continued)

(52) U.S. Cl.
CPC ................. *F01P 7/164* (2013.01); *F01P 5/12* (2013.01); *F04B 49/20* (2013.01); *H02P 29/60* (2016.02);
(Continued)

(58) Field of Classification Search
CPC .......... F01P 7/164; F01P 5/12; F01P 2050/22; F01P 2050/24; H02P 29/60; F04B 49/20;
(Continued)

(56) References Cited

U.S. PATENT DOCUMENTS 5,944,632 A * 8/1999 Hara ................... F16H 61/0031
477/158
7,395,803 B2 * 7/2008 Ledger .................. B60W 10/30
123/196 R (Continued)

FOREIGN PATENT DOCUMENTS

JP 2005214216 A * 8/2005 ............. Y02T 10/62
JP 2009185915 A * 8/2009 ............. F16H 61/00
JP 2014020451 A * 2/2014 ............. F16H 61/00

*Primary Examiner* — Hung Q Nguyen
*Assistant Examiner* — Anthony Donald Taylor, Jr.
(74) *Attorney, Agent, or Firm* — McDonnell Boehnen Hulbert & Berghoff LLP

(57) ABSTRACT

Disclosed are an apparatus and method for controlling an oil pump for a vehicle which may control the speed of the oil pump. The apparatus includes a controller configured to control the speed of the oil pump based on the temperature information of a motor and oil and the speed and torque information of the motor, and, when the vehicle is being driven, the controller confirms whether or not a motor or oil temperature is higher than or equal to a first set temperature, controls the speed of the oil pump to a maximum speed value when the motor or oil temperature is higher than or equal to the first set temperature, and calculates a control speed value and controls the speed of the oil pump to the calculated control speed value when the motor or oil temperature is lower than the first set temperature.

14 Claims, 10 Drawing Sheets

(51) Int. Cl.
*F01P 5/12* (2006.01)
*H02P 29/60* (2016.01)
*F04B 49/20* (2006.01)

(52) U.S. Cl.
CPC ....... *F01P 2050/22* (2013.01); *F01P 2050/24* (2013.01)

(58) Field of Classification Search
CPC ...... B60W 10/30; B60W 10/08; B60W 20/00; B60K 11/02; F01M 1/02; Y02T 10/62
USPC .......................................................... 701/102
See application file for complete search history.

(56) References Cited

U.S. PATENT DOCUMENTS

| | | | |
|---|---|---|---|
| 9,605,567 B2* | 3/2017 | Karnjate | F01M 1/02 |
| 2004/0187835 A1* | 9/2004 | Hoff | F01M 1/16 |
| | | | 123/196 R |
| 2010/0320019 A1* | 12/2010 | Gale | F16H 57/0434 |
| | | | 180/65.27 |
| 2011/0084638 A1* | 4/2011 | Patel | H02P 6/085 |
| | | | 318/400.32 |
| 2011/0135499 A1* | 6/2011 | Lee | F16H 61/0031 |
| | | | 417/44.1 |
| 2011/0166727 A1* | 7/2011 | Light | F16H 57/0441 |
| | | | 701/22 |
| 2015/0120105 A1* | 4/2015 | Naqvi | B60W 10/103 |
| | | | 701/22 |
| 2016/0025207 A1* | 1/2016 | Miyamoto | F16H 61/0028 |
| | | | 701/68 |

* cited by examiner

| | | MOTOR SPEED (rpm) | | | | | | | | | |
|---|---|---|---|---|---|---|---|---|---|---|---|
| | | 250 | 1000 | 2000 | 3000 | 4000 | 6000 | 8000 | 10000 | 12000 | 14000 |
| MOTOR TORQUE (Nm) | 300 | 3500 | 3500 | 3500 | 3500 | 3500 | | | | | |
| | 200 | 2000 | 2000 | 1500 | 2000 | 3500 | 2500 | 3500 | | | |
| | 150 | 1000 | 1000 | 1000 | 1500 | 1500 | 1500 | 1500 | 3500 | | |
| | 100 | 500 | 1000 | 1000 | 1000 | 1000 | 1000 | 1000 | 1500 | 3500 | 3500 |
| | 60 | 500 | 500 | 500 | 500 | 500 | 500 | 500 | 500 | 500 | 500 |
| | 30 | 200 | 500 | 500 | 500 | 500 | 500 | 500 | 500 | 500 | 500 |
| | 15 | 200 | 500 | 500 | 500 | 500 | 500 | 500 | 500 | 500 | 500 |
| | 0 | 200 | 500 | 500 | 500 | 500 | 500 | 500 | 500 | 500 | 500 |
| | -15 | 200 | 500 | 500 | 500 | 500 | 500 | 500 | 500 | 500 | 500 |
| | -30 | 200 | 500 | 500 | 500 | 500 | 500 | 500 | 500 | 500 | 500 |
| | -60 | 500 | 500 | 500 | 500 | 500 | 500 | 500 | 500 | 500 | 500 |
| | -100 | 500 | 1000 | 1000 | 1000 | 1000 | 1000 | 1000 | 1500 | 3500 | 3500 |
| | -150 | 1000 | 1000 | 1000 | 1500 | 1500 | 1500 | 1500 | 3500 | | |
| | -200 | 2000 | 2000 | 1500 | 2000 | 3500 | 2500 | 3500 | | | |
| | -300 | 3500 | 3500 | 3500 | 3500 | 3500 | | | | | |

FIG. 4

| MOTOR TEMPERATURE(℃) | -20 | 0 | 20 | 40 | 60 | 80 | 100 | 120 | 140 | 160 |
|---|---|---|---|---|---|---|---|---|---|---|
| CORRECTION FACTOR($\alpha$) | 0.4 | 0.5 | 0.8 | 1 | 1 | 1.1 | 1.2 | 1.3 | 1.8 | 2.0 |

320

| OIL TEMPERATURE(℃) | -40 | -25 | -10 | 5 | 20 | 35 | 50 | 65 | 80 | 95 | 110 |
|---|---|---|---|---|---|---|---|---|---|---|---|
| CORRECTION FACTOR(γ) | 200 | 300 | 500 | 800 | 1100 | 1700 | 2300 | 2900 | 3500 | 3500 | 3500 |

APPARATUS AND METHOD FOR CONTROLLING OIL PUMP FOR VEHICLE

CROSS REFERENCE TO RELATED APPLICATIONS

This application claims the benefit of Korean Patent Application No. 10-2020-0077809, filed on Jun. 25, 2020, which is hereby incorporated by reference as if fully set forth herein.

BACKGROUND

Field

The present disclosure relates to an apparatus for controlling an oil pump for a vehicle, and more particularly, to an apparatus and method for controlling an oil pump for a vehicle which may control the speed of the oil pump for cooling a motor so that the vehicle may be driven with optimal efficiency.

Discussion of the Related Art

Recently, as interest in the environment has increased, environmentally-friendly vehicles characterized by increased fuel efficiency and reduced exhaust gas emissions are being actively studied.

As representative examples of these environmentally-friendly vehicles, there are an electric vehicle (EV) and a hybrid electric vehicle (HEV).

In general, a hybrid electric vehicle uses two kinds of power sources, and the power sources are mostly an engine and an electric motor.

In addition, an electric vehicle means a vehicle driven using only power of an electric motor without an engine.

These environmentally-friendly vehicles may include an electric oil pump (EOP) which supplies cooling oil to a motor so as to cool the motor.

When the EOP is operated to cool the motor, the operating speed of the EOP may become a key factor.

Control of the speed of the EOP is determined by the temperature of the motor and the temperature of the oil, and the operating speed of the EOP may be changed depending on the temperature of the motor and the temperature of the oil.

However, in such control of the speed of the EOP, protection of motor parts for preventing demagnetization occurring in the motor caused by insufficient cooling is considered, but it is difficult to drive the vehicle with optimal system efficiency.

In a conventional EOP speed control method in which the speed of the EOP is changed depending on the temperature of the motor and the temperature of the oil, when the vehicle is coasting, the drag value of a driving system including the motor and a reducer is changed depending on a change in the speed of the EOP, and thus variation in coasting may occur and the reliability of the driving system may be lowered.

Further, in the conventional EOP speed control method in which the speed of the EOP is determined by the temperature of the motor and the temperature of the oil, variation in coasting may occur due to oil churning caused when a rotor of the motor or gears of the reducer are rotated, and thus, reliability of the driving system may be lowered.

Therefore, development of an apparatus for control an electric oil pump (EOP) for a vehicle, which may optimize the speed of the EOP so as to ensure consistency in coasting and to allow the vehicle to be driven with optimal efficiency, is required.

SUMMARY

Accordingly, the present disclosure is directed to an apparatus and method for controlling an oil pump for a vehicle that substantially obviate one or more problems due to limitations and disadvantages of the related art.

An object of the present disclosure is to provide an apparatus and method for controlling an oil pump for a vehicle, which may control the speed of the oil pump based on the temperatures of a motor and oil and the speed and the torque of the motor, and thus optimize the speed of the oil pump, for example, an electric oil pump (EOP), so as to ensure consistency in coasting and to allow the vehicle to be driven with optimal efficiency.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an apparatus for controlling an oil pump for a vehicle configured to supply oil for cooling a motor includes a first information acquirer configured to acquire temperature information of the motor and the oil, a second information acquirer configured to acquire speed and torque information of the motor, and a controller configured to control a speed of the oil pump based on the acquired temperature information of the motor and the oil and the acquired speed and torque information of the motor, wherein, when the vehicle is being driven, the controller confirms whether or not a temperature of the motor or a temperature of the oil is higher than or equal to a first set temperature based on the temperature information of the motor and the oil, controls the speed of the oil pump to a maximum speed value when the temperature of the motor or the temperature of the oil is higher than or equal to the first set temperature, and calculates a control speed value of the oil pump based on the temperature information of the motor and the oil and the speed and torque information of the motor and controls the speed of the oil pump to the calculated control speed value when the temperature of the motor or the temperature of the oil is lower than the first set temperature.

In another aspect of the present disclosure, a method for controlling an oil pump for a vehicle in an apparatus, including a controller configured to control a speed of the oil pump configured to supply oil for cooling a motor, includes confirming, by the controller, whether or not the vehicle is being driven, acquiring, by the controller, temperature information of the motor and the oil and speed and torque information of the motor when the vehicle is being driven, confirming, by the controller, whether or not a temperature of the motor or a temperature of the oil is higher than or equal to a first set temperature based on the temperature information of the motor and the oil, and controlling, by the controller, the speed of the oil pump to a maximum speed value when the temperature of the motor or the temperature of the oil is higher than or equal to the first set temperature, and calculating a control speed value of the oil pump based on the temperature information of the motor and the oil and the speed and torque information of the motor and controlling the speed of the oil pump to the calculated control speed value when the temperature of the motor or the temperature of the oil is lower than the first set temperature.

In yet another aspect of the present disclosure, a computer readable recording medium, in which a program for executing the method for controlling the oil pump in the apparatus for controlling the oil pump is recorded, executes a process provided by the method for controlling the oil pump.

In still yet another aspect of the present disclosure, a vehicle includes an oil pump configured to supply oil for cooling a motor, and an apparatus for controlling the oil pump configured to control a speed of the oil pump based on temperature information of the motor and the oil and speed and torque information of the motor, wherein, when the vehicle is being driven, the apparatus confirms whether or not a temperature of the motor or a temperature of the oil is higher than or equal to a first set temperature based on the temperature information of the motor and the oil, controls the speed of the oil pump to a maximum speed value when the temperature of the motor or the temperature of the oil is higher than or equal to the first set temperature, and calculates a control speed value of the oil pump based on the temperature information of the motor and the oil and the speed and torque information of the motor and controls the speed of the oil pump to the calculated control speed value when the temperature of the motor or the temperature of the oil is lower than the first set temperature.

It is to be understood that both the foregoing general description and the following detailed description of the present disclosure are exemplary and explanatory and are intended to provide further explanation of the disclosure as claimed.

BRIEF DESCRIPTION OF THE FIGURES

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 3, 4, 5, and 6 show table maps for calculating a control speed value of the oil pump;

DETAILED DESCRIPTION

Figure 1:
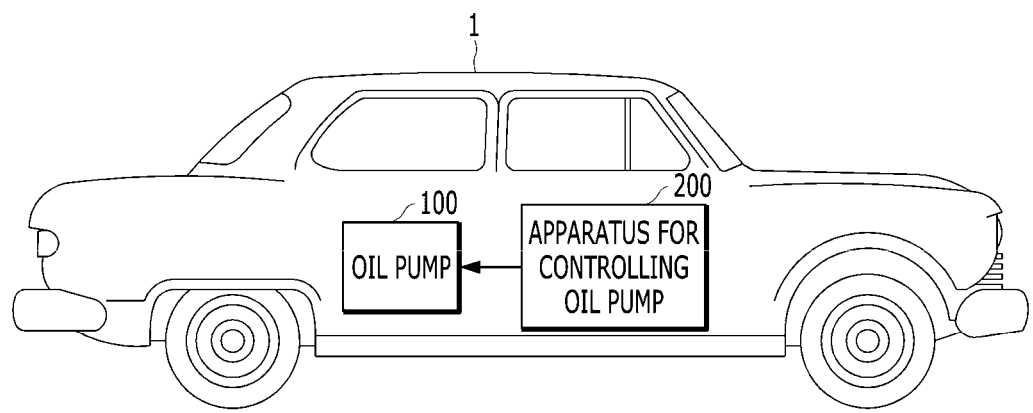
FIG. 1 is a view illustrating a vehicle including an apparatus for controlling an oil pump according to one embodiment of the present disclosure.

Reference will now be made in detail to the preferred embodiments of the present disclosure, examples of which are illustrated in the accompanying drawings. However, the disclosure of the disclosure is not limited to the embodiments set forth herein, and may be variously modified. In the drawings, in order to clearly describe the present disclosure, descriptions of elements which are not related to the present disclosure will be omitted, and the same or similar elements are denoted by the same reference numerals even when they are depicted in different drawings.

In the following description of the embodiments, it will be understood that, when a part is said to "include" an element, the part may further include other elements and does not exclude presence of such other elements, unless stated otherwise. Further, in the following description of the embodiments, it will be understood that the suffixes "part", "unit" and "module" indicate units for processing at least one function or operation, and may be implemented using hardware, software, or a combination of hardware and software.

Hereinafter, with reference to FIGS. 1 to 10, an apparatus and method for controlling an oil pump for a vehicle, which are applicable to the embodiments of the present disclosure, will be described in detail.

In the present disclosure, the oil pump may be an electric oil pump (EOP), but is not limited thereto, and various types of oil pumps may be employed.

Further, a motor and reducer system according to the present disclosure may be applied not only to an integral system, into which a motor and a reducer are integrated, but also to a distributed system, in which a motor and a reducer are implemented separately.

FIG. 1 is a view illustrating a vehicle including an apparatus for controlling an oil pump according to one embodiment of the present disclosure.

As shown in FIG. 1, a vehicle 1 according to the present disclosure includes an oil pump 100 which supplies oil for cooling a motor, and an apparatus 200 for controlling the oil pump 100 which controls the speed of the oil pump 100 based on the temperature information of the motor and oil and the speed and torque information of the motor.

Here, the oil pump 100 may be an electric oil pump (EOP), but is not limited thereto.

Further, the oil pump 100 may supply the oil for cooling the motor to an integral system, into which a motor and a reducer are integrated, but also to a distributed system, in which a motor and a reducer are implemented separately.

Thereafter, when the vehicle is being driven, the apparatus 200 may confirm whether or not the temperature of the motor or the temperature of the oil is higher than or equal to a first set temperature based on temperature information of the motor and the oil, control the speed of the oil pump 100 to a maximum speed value when the temperature of the motor or the temperature of the oil is higher than or equal to the first set temperature, and calculate a control speed value of the oil pump 100 based on the temperature information of the motor and the oil and the speed and torque information of the motor and control the speed of the oil pump 100 to the calculated control speed value when the temperature of the motor or the temperature of the oil is lower than the first set temperature.

In the confirmation as to whether or not the temperature of the motor or the temperature of the oil is higher than or equal to the first set temperature, the apparatus 200 may confirm whether or not the temperature of the motor is higher than or equal to a first set motor temperature or the temperature of the oil is higher than or equal to a first set oil temperature.

For example, the first set motor temperature is a threshold temperature for protecting the motor and may be stored in advance in a memory, and the first set oil temperature is a threshold temperature for protecting the oil and may be stored in advance in the memory.

In some cases, the apparatus 200 may acquire the first set motor temperature or the first set oil temperature from an internal memory located inside the vehicle 1 or an external memory located outside the vehicle 1.

Further, in the control of the speed of the oil pump 100 to the maximum speed value, the apparatus 200 may set the speed of the oil pump 100 to the maximum speed value and transmit a speed control command to the oil pump 100 so as to operate the oil pump 100 at the set maximum speed value.

After controlling the speed of the oil pump 100 to the maximum speed value, the apparatus 200 may confirm whether or not the temperature of the motor and the temperature of the oil are respectively lower than second set temperatures.

That is, the apparatus 200 may confirm whether or not the temperature of the motor is lower than a second set motor temperature and whether or not the temperature of the oil is lower than a second set oil temperature.

For example, the second set motor temperature is a value acquired by subtracting a motor hysteresis setting temperature from the first set motor temperature and may be stored in advance in the memory, and the second set oil temperature is a value acquired by subtracting an oil hysteresis setting temperature from the first set oil temperature and may be stored in advance in the memory.

Thereafter, the apparatus 200 may confirm whether or not the temperature of the motor or the temperature of the oil is higher than or equal to the first set temperature based on the temperature information of the motor and the oil when the temperature of the motor and the temperature of the oil are respectively lower than the corresponding second set temperatures, and control the speed of the oil pump 100 to the maximum speed value when the temperature of the motor and the temperature of the oil are not lower than the corresponding second set temperatures.

Further, in the calculation of the control speed value of the oil pump 100, the apparatus 200 may calculate a basic speed value of the oil pump 100 based on the speed and the torque of the motor, calculate a first speed correction value of the oil pump 100 based on the temperature of the motor, calculate a second speed correction value of the oil pump 100 based on the temperature of the oil, calculate a speed limit value of the oil pump 100 based on the temperature of the oil, and calculate the control speed value of the oil pump 100 based on the basic speed value, the first and second speed correction values and the speed limit value.

For example, in the calculation of the basic speed value of the oil pump 100, the apparatus 200 may calculate the basic speed value of the oil pump 100 corresponding to the speed and the torque of the motor from a basic speed map stored in advance in the memory.

Further, in the calculation of the first speed correction value of the oil pump 100, the apparatus 200 may calculate the first speed correction value of the oil pump 100 corresponding to the temperature of the motor from a motor temperature correction map stored in advance in the memory.

In addition, in the calculation of the second speed correction value of the oil pump 100, the apparatus 200 may calculate the second speed correction value of the oil pump 100 corresponding to the temperature of the oil from an oil temperature correction map stored in advance in the memory.

Moreover, in the calculation of the speed limit value of the oil pump 100, the apparatus 200 may calculate the speed limit value of the oil pump 100 corresponding to the temperature of the oil from an oil pump speed limit map stored in advance in the memory.

In the calculation of the control speed value of the oil pump 100 based on the basic speed value, the first and second speed correction values and the speed limit value, the apparatus 200 may calculate the control speed value of the oil pump 100 as the minimum value among first control speed values, calculated by multiplying the basic speed value by the first and second speed correction values, and a second control speed value corresponding to the speed limit value.

Thereafter, in the control of the oil pump 100 to the calculated control speed value, the apparatus 200 may set the speed of the oil pump 100 to the control speed value, and transmit a speed control command to the oil pump 100 so that the oil pump 100 is operated at the set control speed value.

As such, in the present disclosure, the speed of the oil pump 100 is controlled based on the temperatures of the motor and the oil and the speed and the torque of the motor, and thus, the speed of the oil pump 100 may be optimized so as to ensure consistency in coasting and to allow the vehicle to be driven with optimal efficiency.

That is, in the present disclosure, parts of the motor and reducer system may be protected, and minimization of drag when coasting, consistency in coasting and optimization of system energy efficiency may be ensured.

Further, in the present disclosure, the speed of the oil pump remains constant and thus variation in drag in the motor and reducer system does not occur, thereby making it possible to optimize the system energy efficiency and thus preventing an increase in development costs and improving testing efficiency.

Figure 2:
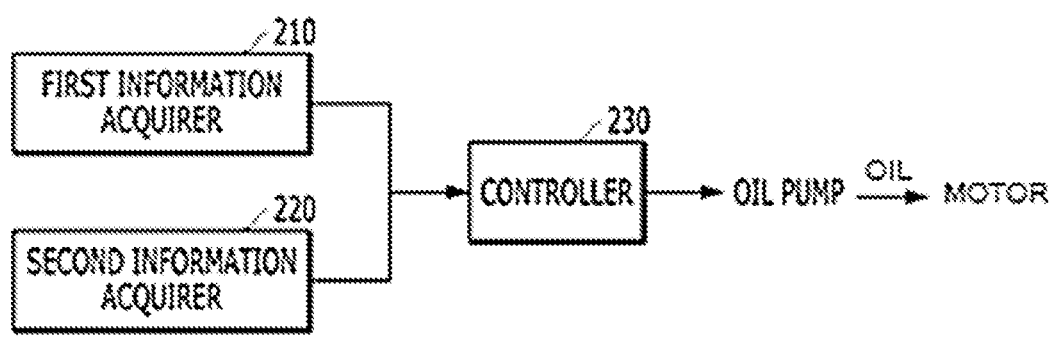
FIG. 2 is a block diagram illustrating an apparatus for controlling an oil pump according to one embodiment of the present disclosure.

FIG. 2 is a block diagram illustrating the apparatus 200 according to one embodiment of the present disclosure.

As shown in FIG. 2, the apparatus 200 according to the present disclosure may include a first information acquirer 210 configured to acquire the temperature information of the motor and the oil, a second information acquirer 220 configured to acquire the speed and torque information of the motor, and a controller 230 configured to control the speed of the oil pump based on the acquired temperature information of the motor and the oil and the acquired speed and torque information of the motor.

Here, when the vehicle is being driven, the first information acquirer 210 may acquire the temperature information of the motor from a first temperature sensor configured to measure the temperature of the motor, and acquire the temperature information of the oil from a second temperature sensor configured to measure the temperature of the oil.

For example, the first temperature sensor may measure the temperature of a coil in a driving motor and then provide the measured temperature as the temperature information of the motor, and the second temperature sensor may measure the internal temperature of an oil cooler and then provide the measured temperature as the temperature information of the oil.

Next, when the vehicle is being driven, the second information acquirer 220 may acquire the speed and torque information of the motor from sensors configured to measure the speed and the torque of the motor.

Thereafter, when the vehicle is being driven, the controller 230 may confirm whether or not the temperature of the motor or the temperature of the oil is higher than or equal to the first set temperature based on the temperature information of the motor and the oil, control the speed of the oil pump to the maximum speed value when the temperature of the motor or the temperature of the oil is higher than or equal to the first set temperature, and calculate the control speed value of the oil pump based on the temperature information of the motor and the oil and the speed and torque information of the motor and control the speed of the oil pump to the calculated control speed value when the temperature of the motor or the temperature of the oil is lower than the first set temperature.

Here, in the confirmation as to whether or not the temperature of the motor or the temperature of the oil is higher than or equal to the first set temperature, the controller 230 may determine whether or not the vehicle is being driven based on the speed of the vehicle, and confirm whether or not the temperature of the motor or the temperature of the oil is higher than or equal to the first set temperature upon determining that the vehicle is being driven.

For example, in the determination as to whether or not the vehicle is being driven, the controller 230 may determine that the vehicle is being driven when the speed of the vehicle is greater than 0.

Further, in the confirmation as to whether or not the temperature of the motor or the temperature of the oil is higher than or equal to the first set temperature, the controller 230 may confirm whether or not the temperature of the motor is higher than or equal to the first set motor temperature or whether or not the temperature of the oil is higher than or equal to the first set oil temperature.

Here, the first set motor temperature is a threshold temperature for protecting the motor and may be stored in advance in the memory.

The first set oil temperature is a threshold temperature for protecting the oil and may be stored in advance in the memory.

In some cases, the controller 230 may acquire the first set motor temperature or the first set oil temperature from an internal memory located inside the vehicle or an external memory located outside the vehicle.

Next, in the control of the speed of the oil pump to the maximum speed value, the controller 230 may set the speed of the oil pump to the maximum speed value and transmit a speed control command to the oil pump so as to operate the oil pump at the set maximum speed value.

After controlling the speed of the oil pump to the maximum speed value, the controller 230 may confirm whether or not the temperature of the motor and the temperature of the oil are respectively lower than second set temperatures.

That is, in the confirmation as to whether or not the temperature of the motor and the temperature of the oil are respectively lower than the second set temperatures, the controller 230 may confirm whether or not the temperature of the motor is lower than the second set motor temperature and whether or not the temperature of the oil is lower than the second set oil temperature.

For example, the second set motor temperature is a value acquired by subtracting a motor hysteresis setting temperature from the first set motor temperature and may be stored in advance in the memory.

The second set oil temperature is a value acquired by subtracting an oil hysteresis setting temperature from the first set oil temperature and may be stored in advance in the memory.

In some cases, the controller 230 may acquire the second set motor temperature or the second set oil temperature from the internal memory located inside the vehicle or the external memory located outside the vehicle.

Thereafter, in the confirmation as to whether or not the temperature of the motor and the temperature of the oil are respectively lower than the corresponding second set temperatures, when the temperature of the motor and the temperature of the oil are respectively lower than the corresponding second set temperatures, the controller 230 may further perform a process of confirming whether or not the temperature of the motor or the temperature of the oil is higher than or equal to the first set temperature based on the temperature information of the motor and the oil.

Otherwise, in the confirmation as to whether or not the temperature of the motor and the temperature of the oil are respectively lower than the corresponding second set temperatures, when the temperature of the motor and the temperature of the oil are not lower than the corresponding second set temperatures, the controller 230 may further perform a process of controlling the speed of the oil pump 100 to the maximum speed value.

Further, in the calculation of the control speed value of the oil pump, the controller 230 may calculate the basic speed value of the oil pump based on the speed and the torque of the motor, calculate the first speed correction value of the oil pump based on the temperature of the motor, calculate the second speed correction value of the oil pump based on the temperature of the oil, calculate the speed limit value of the oil pump based on the temperature of the oil, and calculate the control speed value of the oil pump based on the basic speed value, the first and second speed correction values and the speed limit value.

Here, in the calculation of the basic speed value of the oil pump, the controller 230 may calculate the basic speed value of the oil pump corresponding to the speed and the torque of the motor from the basic speed map stored in advance in the memory.

For example, the basic speed value of the oil pump may be a function of motor speed and motor torque.

Further, in the calculation of the first speed correction value of the oil pump, the controller 230 may calculate the first speed correction value of the oil pump corresponding to the temperature of the motor from the motor temperature correction map stored in advance in the memory.

For example, the first speed correction value of the oil pump may be a function of motor temperature, and be a correction factor.

In addition, in the calculation of the second speed correction value of the oil pump, the controller 230 may calculate the second speed correction value of the oil pump corresponding to the temperature of the oil from the oil temperature correction map stored in advance in the memory.

For example, the second speed correction value of the oil pump may be a function of oil temperature, and be a correction factor.

Moreover, in the calculation of the speed limit value of the oil pump, the controller 230 may calculate the speed limit value of the oil pump corresponding to the temperature of the oil from the oil pump speed limit map stored in advance in the memory.

For example, the speed limit value of the oil pump may be a function of oil temperature.

Further, in the calculation of the control speed value of the oil pump, the controller 230 may calculate the control speed value of the oil pump as the minimum value among the first control speed values, calculated by multiplying the basic speed value by the first and second speed correction values, and the second control speed value corresponding to the speed limit value.

Thereafter, in the control of the speed of the oil pump to the calculated control speed value, the controller 230 may set the speed of the oil pump to the control speed value, and transmit a speed control command to the oil pump so that the oil pump is operated at the set control speed value.

FIGS. 3 to 6 show table maps for calculating the control speed value of the oil pump.

In the present disclosure, when the temperature of the motor or the temperature of the oil is higher than or equal to a set temperature, the speed of the oil pump may be set to the maximum speed value so as to protect parts of the system, and when the temperature of the motor or the temperature of the oil is lower than the set temperature, the control speed value of the oil pump may be calculated so as to minimize drag when coasting, to ensure consistency in coasting and to optimize system energy efficiency.

As shown in FIGS. 3 to 6, in the present disclosure, the control speed value of the oil pump may be calculated based on the basic speed value, the first and second speed correction values, and the speed limit value.

As shown in FIG. 3, in the present disclosure, in the calculation of the basic speed value of the oil pump, the basic speed value of the oil pump corresponding to the speed and the torque of the motor may be calculated from a basic speed map 310 stored in advance in the memory.

For example, the basic speed value of the oil pump may be a function of motor speed and motor torque.

Further, as shown in FIG. 4, in the calculation of the first speed correction value of the oil pump, the first speed correction value of the oil pump corresponding to the temperature of the motor may be calculated from a motor temperature correction map 320 stored in advance in the memory.

For example, the first speed correction value of the oil pump may be a function of motor temperature, and have a first correction factor $\alpha$. The first correction factor $\alpha$ may be set based on actual test results.

Figure 5:

In addition, as shown in FIG. 5, in the calculation of the second speed correction value of the oil pump, the second speed correction value of the oil pump corresponding to the temperature of the oil may be calculated from an oil temperature correction map 330 stored in advance in the memory.

For example, the second speed correction value of the oil pump may be a function of oil temperature, and have a second correction factor $\beta$.

Figure 6:

Moreover, as shown in FIG. 6, in the calculation of the speed limit value of the oil pump, the speed limit value of the oil pump corresponding to the temperature of the oil may be calculated from an oil pump speed limit map 340 stored in advance in the memory.

For example, the speed limit value of the oil pump may be a function of oil temperature.

As such, in the present disclosure, the basic speed value, the first and second speed correction values and the speed limit value may be respectively calculated based on the table maps stored in the memory, and the control speed value of the oil pump may be calculated as the minimum value among the first control speed values, calculated by multiplying the basic speed value by the first and second speed correction values, and the second control speed value corresponding to the speed limit value. The correction factor $\gamma$ may be a value determined by testing the maximum pump drive speed by oil temperature.

Figure 7:
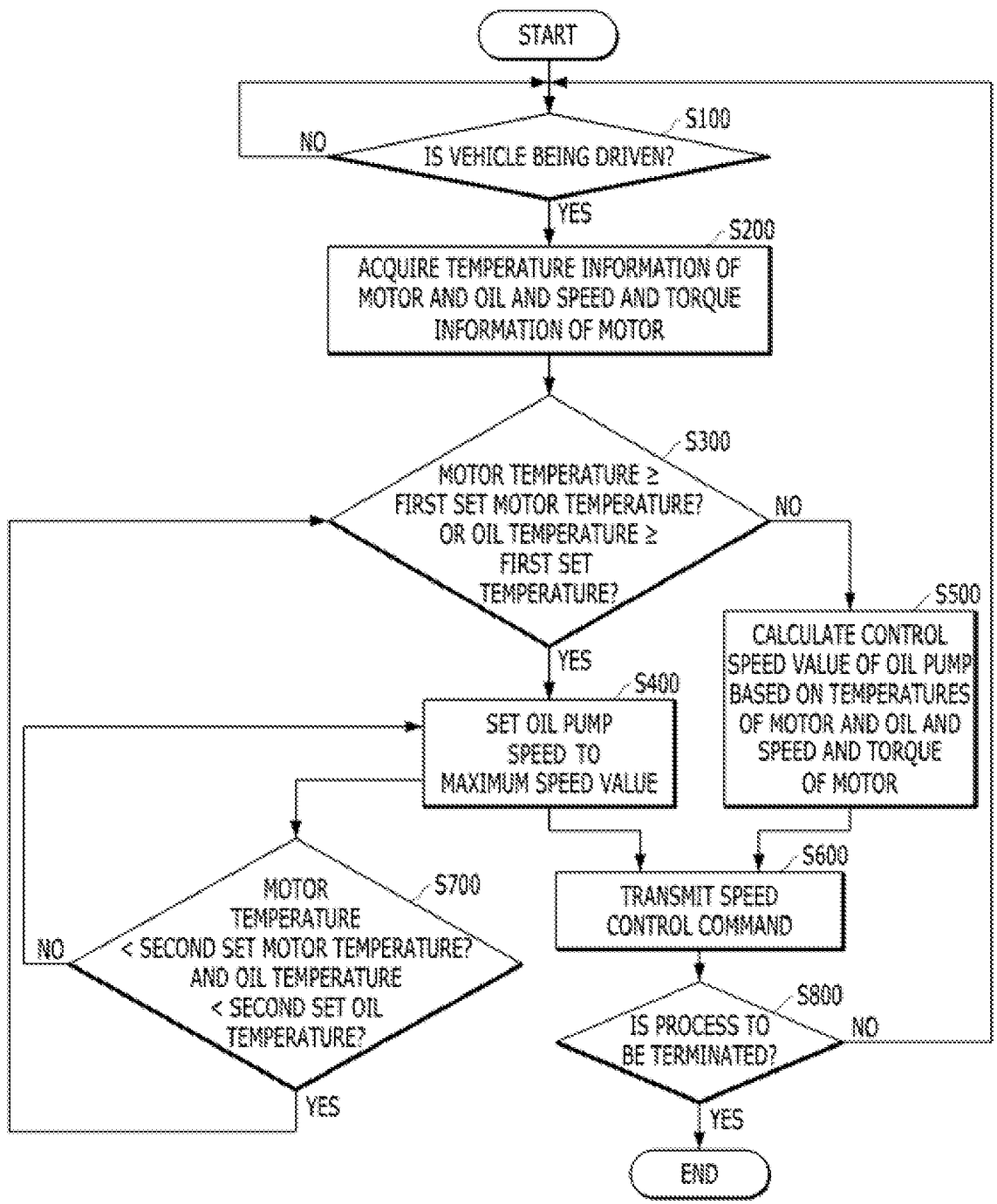
FIGS. 7 and 8 are flowcharts showing a method for controlling an oil pump according to one embodiment of the present disclosure.
Figure 8:
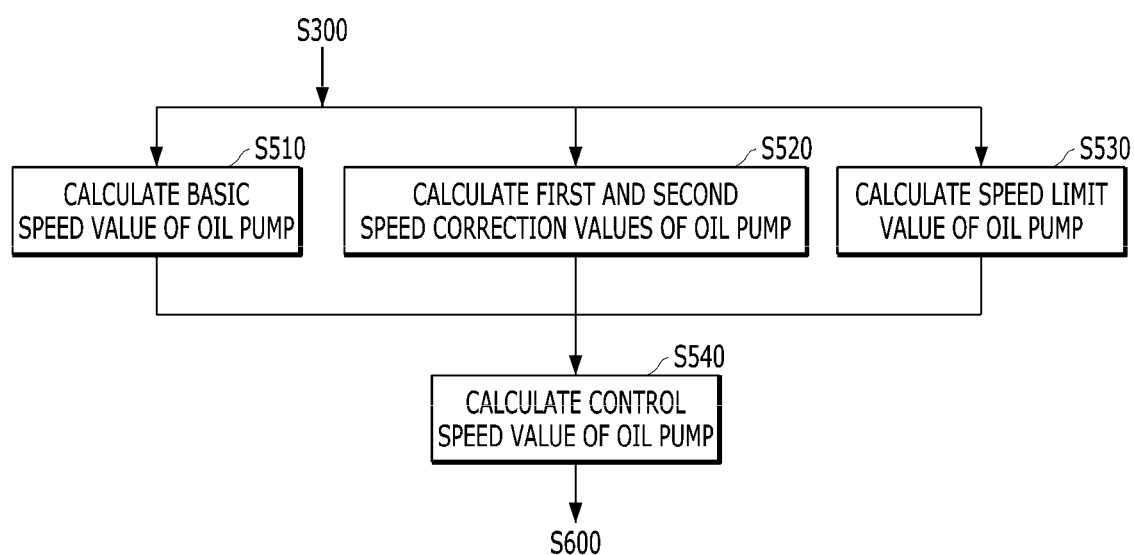

FIGS. 7 and 8 are flowcharts showing a method for controlling an oil pump according to one embodiment of the present disclosure.

As shown in FIG. 7, in the present disclosure, first, whether or not a vehicle is being driven is confirmed at S100.

Here, in the present disclosure, when the speed of the vehicle is greater than 0, it may be determined that the vehicle is being driven.

Thereafter, in the present disclosure, when the vehicle is being driven, the temperature information of a motor and oil and the speed and torque information of the motor may be acquired at S200.

Subsequently, in the present disclosure, whether or not the temperature of the motor is higher than or equal to a first set motor temperature or the temperature of the oil is higher than or equal to a first set oil temperature may be confirmed based on the temperature information of the motor and the oil at S300.

Further, in the present disclosure, when the temperature of the motor is higher than or equal to the first set motor temperature or the temperature of the oil is higher than or equal to the first set oil temperature, the speed of the oil pump may be set to the maximum speed value at S400.

Next, in the present invention, a speed control command may be transmitted to the oil pump so that the oil pump is operated at the set control speed value at S600.

Also, in the present disclosure, after setting the speed of the oil pump to the maximum speed value at S400, whether or not the temperature of the motor is lower than a second set motor temperature and the temperature of the oil is lower than a second set oil temperature may be confirmed at S700.

Here, in the present disclosure, when the temperature of the motor is lower than the second set motor temperature and the temperature of the oil is lower than the second set oil temperature, step S300 for confirming whether or not the temperature of the motor is higher than or equal to the first set motor temperature or the temperature of the oil is higher than or equal to the first set oil temperature based on the temperature information of the motor and the oil may be performed.

Otherwise, when the temperature of the motor is not lower than the second set motor temperature and the temperature of the oil is not lower than the second set oil temperature, step S400 for controlling the speed of the oil pump to the maximum speed value may be performed.

Further, in the present disclosure, in step S300 for confirming whether or not the temperature of the motor is higher than or equal to the first set motor temperature or the temperature of the oil is higher than or equal to the first set oil temperature, when the temperature of the motor is lower than the first set motor temperature or the temperature of the oil is lower than the first set oil temperature, the control speed value of the oil pump may be calculated based on the temperature information of the motor and the oil and the speed and torque information of the motor at S500.

Next, in the present disclosure, a speed control command may be transmitted to the oil pump so that the oil pump is operated at the set control speed value at S600.

Thereafter, in the present disclosure, whether or not the process of controlling the oil pump is to be terminated may be confirmed at S800, and upon confirming that the process of controlling the oil pump is to be terminated, the process of controlling the oil pump may be terminated.

FIG. 8 is a flowchart illustrating step S500 for calculating the control speed value of the oil pump in FIG. 7 in more detail.

As shown in FIG. 8, in the present disclosure, when the temperature of the motor is lower than the first set motor temperature or the temperature of the oil is lower than the first set oil temperature, a basic speed value of the oil pump may be calculated based on the speed and the torque of the motor at S510, a first speed correction value of the oil pump may be calculated based on the temperature of the motor and a second speed correction value of the oil pump may be calculated based on the temperature of the oil at S520, and a speed limit value of the oil pump may be calculated based on the temperature of the oil at S530.

Here, in the present disclosure, the basic speed value of the oil pump corresponding to the speed and the torque of the motor may be calculated from a basic speed map stored in a memory, the first speed correction value of the oil pump corresponding to the temperature of the motor may be calculated from a motor temperature correction map stored in the memory, the second speed correction value of the oil pump corresponding to the temperature of the oil may be calculated from an oil temperature correction map stored in the memory, and the speed limit value of the oil pump corresponding to the temperature of the oil may be calculated from an oil pump speed limit map stored in the memory.

Thereafter, in the present disclosure, the control speed value of the oil pump may be calculated based on the calculated basic speed value, first and second speed correction values and speed limit value at S540.

Here, in the present disclosure, the minimum value among first control speed values, calculated by multiplying the basic speed value by the first and second speed correction values, and a second control speed value corresponding to the speed limit value, may be calculated as the control speed value of the oil pump.

As such, in the present disclosure, the speed of the oil pump is controlled based on the temperatures of the motor and the oil and the speed and the torque of the motor, and thus the speed of the oil pump, for example, an electric oil pump (EOP), may be optimized so as to ensure consistency in coasting and to allow the vehicle to be driven with optimal efficiency.

That is, in the present disclosure, parts of the motor and reducer system may be protected, and minimization of drag when coasting, consistency in coasting and optimization of system energy efficiency may be ensured.

Further, in the present disclosure, the speed of the oil pump remains constant and thus variation in drag in the motor and reducer system does not occur, thereby making it possible to optimize system energy efficiency and thus preventing an increase in development costs and improving testing efficiency.

Figure 9A:
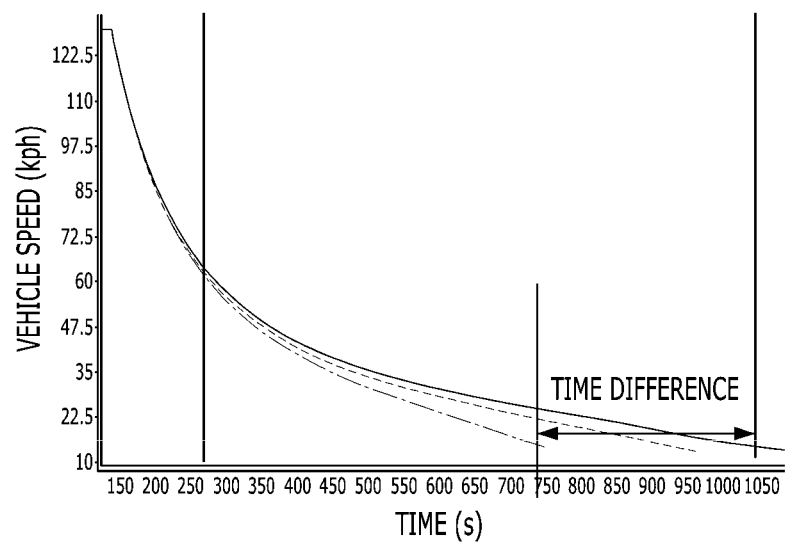
FIGS. 9A and 9B are graphs illustrating variation in system drag depending on whether or not oil pump speed control according to the present disclosure is performed.
Figure 9B:
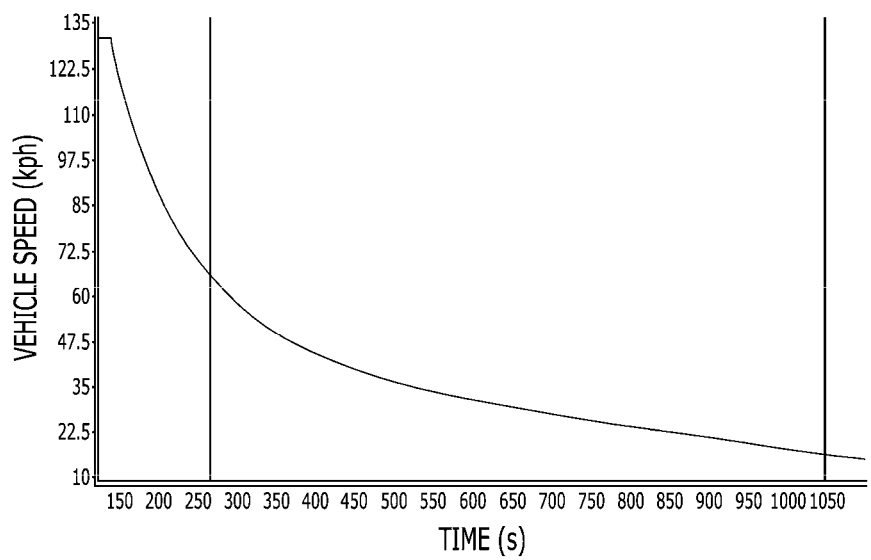

FIGS. 9A and 9B are graphs illustrating variation in system drag depending on whether or not oil pump speed control according to the present disclosure is performed.

FIG. 9A is a graph illustrating variation in system drag when oil pump speed control according to the present disclosure is not performed, and it may be confirmed that the speed of the oil pump is varied depending on changes in the temperatures of the motor and oil while coasting, and thus variation of drag in the system occurs.

On the other hand, FIG. 9B is a graph illustrating variation in system drag when oil pump speed control according to the present disclosure is performed, it may be confirmed that the speed of the oil pump is constant while coasting, and thus no variation of drag in the system occurs.

Therefore, in the present disclosure, drag when coasting may be minimized, consistency in coasting may be ensured, and system energy efficiency may be optimized.

Figure 10A:
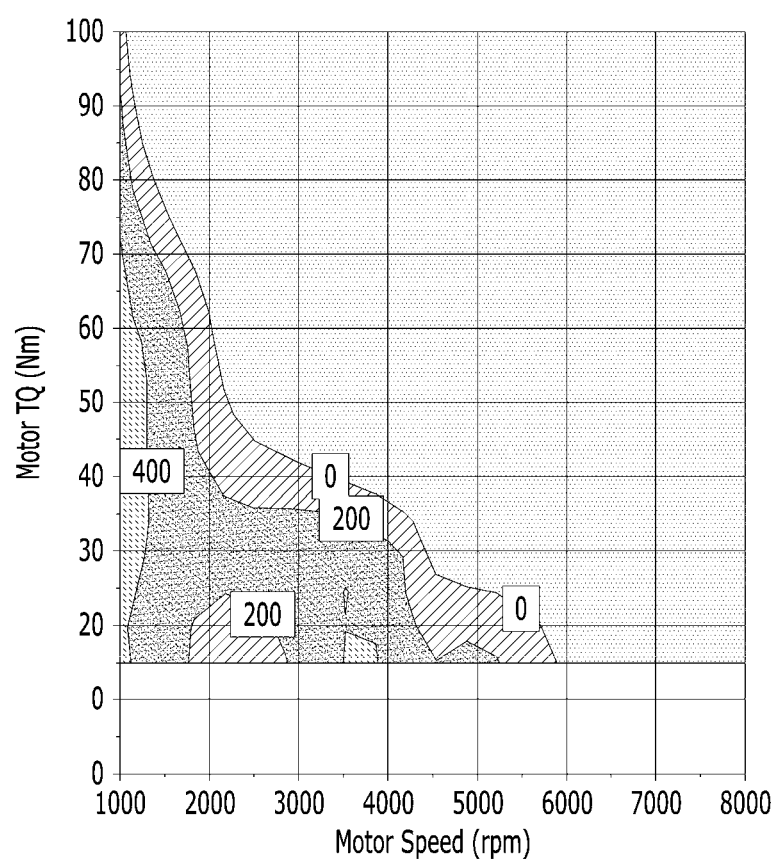
FIGS. 10A and 10B are graphs illustrating system energy efficiency depending on whether or not oil pump speed control according to the present disclosure is performed.
Figure 10B:
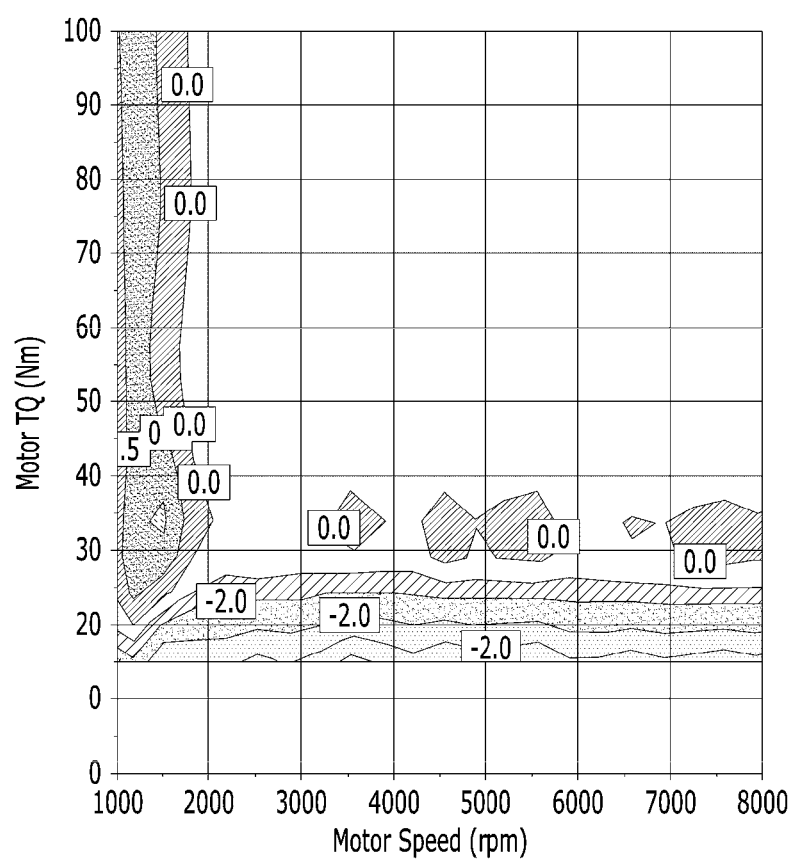

FIGS. 10A and 10B are graphs illustrating system energy efficiency depending on whether or not oil pump speed control according to the present disclosure is performed.

FIG. 10A is a graph illustrating system energy efficiency when oil pump speed control according to the present disclosure is not performed, and it may be confirmed that the speed of the oil pump is varied depending on changes in the temperatures of the motor and the oil while coasting, and thus system energy efficiency is low.

On the other hand, FIG. 10B is a graph illustrating system energy efficiency when oil pump speed control according to the present disclosure is performed, it may be confirmed that the speed of the oil pump is constant while coasting, and thus system energy efficiency is improved.

Here, in the present disclosure, energy efficiency of the system may be improved by about 0.1% compared to a conventional system, but the present disclosure is not limited thereto.

Therefore, in the present disclosure, drag when coasting may be minimized, consistency in coasting may be ensured, and system energy efficiency may be optimized.

In addition, in the present disclosure, a computer readable recording medium, in which a program for executing the method for controlling the oil pump in the apparatus for controlling the oil pump according to one embodiment of the present disclosure is recorded, may execute a process provided by the method for controlling the oil pump.

The present disclosure may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid state disk (SSD), a silicon disk drive (SDD), a ROM, a RAM, a CD-ROM, a magnetic tape, a floppy disk, an optical data storage device, etc.

As is apparent from the above description, in an apparatus and method for controlling an oil pump for a vehicle according to at least one embodiment of the present disclosure, the speed of the oil pump is controlled based on the temperatures of a motor and oil and the speed and the torque of the motor, and thus the speed of the oil pump may be optimized so as to ensure consistency in coasting and to allow the vehicle to be driven with optimal efficiency.

That is, in the present disclosure, parts of a motor and reducer system may be protected, and minimization of drag when coasting, consistency in coasting and optimization of system energy efficiency may be ensured.

Further, in the present disclosure, the speed of the oil pump remains constant and thus variation in drag in the motor and reducer system does not occur, thereby making it possible to optimize system energy efficiency and thus preventing an increase in development costs and improving testing efficiency.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. An apparatus for controlling an oil pump for a vehicle, the oil pump configured to supply oil for cooling a motor, the apparatus comprising:
   a first information acquirer configured to acquire temperature information of the motor and temperature information of the oil;
   a second information acquirer configured to acquire information of speed and torque of the motor; and
   a controller configured to control a speed of the oil pump based on the temperature information of the motor, the temperature information of the oil, and the information of the speed and the torque of the motor;
   wherein, when the vehicle is being driven, the controller is configured to:
   confirm whether or not a temperature of the motor is higher than or equal to a first set motor temperature, or a temperature of the oil is higher than or equal to a first set oil temperature based on the temperature information of the motor and the temperature information of the oil,
   control the speed of the oil pump to a maximum speed value when the temperature of the motor is higher than or equal to the first set motor temperature, or the temperature of the oil is higher than or equal to the first set oil temperature,
   calculate a control speed value of the oil pump based on the temperature information of the motor, the temperature information of the oil, and the information of the speed and the torque of the motor, and
   control the speed of the oil pump to the calculated control speed value when the temperature of the motor is lower than the first set motor temperature, or the temperature of the oil is lower than the first set oil temperature.

2. The apparatus according to claim 1, wherein during the control of the speed of the oil pump to the maximum speed value, the controller sets the speed of the oil pump to the maximum speed value, and transmits a speed control command to the oil pump so as to operate the oil pump at the set maximum speed value.

3. The apparatus according to claim 1, wherein after controlling the speed of the oil pump to the maximum speed value, the controller confirms whether or not the temperature of the motor is lower than a second set motor temperature, and the temperature of the oil is lower than a second set oil temperature, and the controller confirms whether or not the temperature of the motor is higher than or equal to the first set motor temperature, or the temperature of the oil is higher than or equal to the first set oil temperature based on the temperature information of the motor and the temperature information of oil when the temperature of the motor is lower than the second set motor temperature and the temperature of the oil is lower than the second set oil temperature.

4. The apparatus according to claim 3, wherein during the confirmation as to whether or not the temperature of the motor is lower than the second set motor temperature and the temperature of the oil is lower than the second set oil temperature, the controller further controls the speed of the oil pump to the maximum speed value when the temperature of the motor is not lower than the second set motor temperature and the temperature of the oil is not lower than the second set oil temperature.

5. The apparatus according to claim 1, wherein during the calculation of the control speed value of the oil pump, the controller calculates a basic speed value of the oil pump based on the speed and the torque of the motor, calculates a first speed correction value of the oil pump based on the temperature of the motor, calculates a second speed correction value of the oil pump based on the temperature of the oil, calculates a speed limit value of the oil pump based on the temperature of the oil, and calculates the control speed value of the oil pump based on the basic speed value, the first and second speed correction values and the speed limit value.

6. The apparatus according to claim 5, wherein during the calculation of the control speed value of the oil pump, the controller calculates the control speed value of the oil pump as a minimum value among first control speed values, calculated by multiplying the basic speed value by the first and second speed correction values, and a second control speed value corresponding to the speed limit value.

7. The apparatus according to claim 1, wherein during the control of the speed of the oil pump to the calculated control speed value, the controller sets the speed of the oil pump to the control speed value, and transmits a speed control command to the oil pump so as to operate the oil pump at the set control speed value.

8. A method for controlling an oil pump for a vehicle via an apparatus comprising a controller configured to control a speed of the oil pump, the oil pump configured to supply oil for cooling a motor, the method comprising:
   confirming, by the controller, whether or not the vehicle is being driven;
   acquiring, by the controller, temperature information of the motor, temperature information of the oil, and information of speed and torque of the motor when the vehicle is being driven;
   confirming, by the controller, whether or not a temperature of the motor is higher than or equal to a first set motor temperature, or a temperature of the oil is higher than or equal to a first set oil temperature based on the temperature information of the motor and the temperature information of the oil;
   controlling, by the controller, the speed of the oil pump to a maximum speed value when the temperature of the motor is higher than or equal to the first set motor temperature, or the temperature of the oil is higher than or equal to the first set oil temperature,
   calculating a control speed value of the oil pump based on the temperature information of the motor, the temperature information of the oil, and the information of the speed and the torque of the motor, and
   controlling the speed of the oil pump to the calculated control speed value when the temperature of the motor is lower than the first set motor temperature, or the temperature of the oil is lower than the first set oil temperature.

9. The method according to claim 8, wherein the controlling the speed of the oil pump to the maximum speed value comprises:
   confirming whether or not the temperature of the motor is lower than a second set motor temperature, and the temperature of the oil is lower than a second set oil temperature.

10. The method according to claim 9, wherein the confirming whether or not the temperature of the motor is lower than the second set motor temperature and the temperature of the oil is lower than the second set oil temperature comprises:
   confirming whether or not the temperature of the motor is higher than or equal to the first set motor temperature, or the temperature of the oil is higher than or equal to the first set oil temperature based on the temperature information of the motor and the temperature information of the oil when the temperature of the motor is lower than the second set motor temperature, and the temperature of the oil is lower than the second set oil temperature; and controlling the speed of the oil pump to the maximum speed value when the temperature of the motor is not lower than the second set motor temperature, and the temperature of the oil is not lower than the second set oil temperature.

11. The method according to claim 8, wherein the calculating the control speed value of the oil pump comprises:

calculating a basic speed value of the oil pump based on the speed and the torque of the motor;

calculating a first speed correction value of the oil pump based on the temperature of the motor;

calculating a second speed correction value of the oil pump based on the temperature of the oil;

calculating a speed limit value of the oil pump based on the temperature of the oil; and calculating the control speed value of the oil pump based on the basic speed value, the first and second speed correction values and the speed limit value.

12. The method according to claim 11, wherein during the calculation of the control speed value of the oil pump, the control speed value of the oil pump is calculated as a minimum value among first control speed values, calculated by multiplying the basic speed value by the first and second speed correction values, and a second control speed value corresponding to the speed limit value.

13. A non-transitory computer readable recording medium having recorded thereon a program to execute the method according to claim 8.

14. A vehicle comprising:

an oil pump configured to supply oil for cooling a motor; and an apparatus for controlling the oil pump, the apparatus configured to control a speed of the oil pump based on temperature information of the motor, temperature information of the oil, and information of speed and torque of the motor;

wherein when the vehicle is being driven, the apparatus is configured to:

confirm whether or not a temperature of the motor is higher than or equal to a first set motor temperature, or a temperature of the oil is higher than or equal to a first set oil temperature based on the temperature information of the motor and the temperature information of the oil, control the speed of the oil pump to a maximum speed value when the temperature of the motor is higher than or equal to the first set motor temperature, or the temperature of the oil is higher than or equal to the first set oil temperature, calculate a control speed value of the oil pump based on the temperature information of the motor, the temperature information of the oil, and the information of the speed and the torque of the motor, and control the speed of the oil pump to the calculated control speed value when the temperature of the motor is lower than the first set motor temperature, or the temperature of the oil is lower than the first set oil temperature.

* * * * *